United States Patent
Kwon et al.

(10) Patent No.: US 11,120,717 B2
(45) Date of Patent: Sep. 14, 2021

(54) IMAGE DISPLAY DEVICE OF SLOT MACHINE APPARATUS

(71) Applicant: KORTEK CORPORATION, Incheon (KR)

(72) Inventors: Je Young Kwon, Anyang-si (KR); Yong Hun Park, Incheon (KR)

(73) Assignee: KORTEK CORPORATION, Incheon (KR)

( * ) Notice: Subject to any disclaimer, the term of this patent is extended or adjusted under 35 U.S.C. 154(b) by 0 days.

(21) Appl. No.: 16/644,193

(22) PCT Filed: Aug. 29, 2018

(86) PCT No.: PCT/KR2018/009977
§ 371 (c)(1),
(2) Date: Mar. 4, 2020

(87) PCT Pub. No.: WO2019/050210
PCT Pub. Date: Mar. 14, 2019

(65) Prior Publication Data
US 2021/0065598 A1    Mar. 4, 2021

(30) Foreign Application Priority Data

Sep. 6, 2017   (KR) .................. 10-2017-0113890

(51) Int. Cl.
*G09G 3/00*     (2006.01)
*G06F 3/041*    (2006.01)
(Continued)

(52) U.S. Cl.
CPC .............. *G09G 3/035* (2020.08); *G06F 3/041* (2013.01); *G07F 17/3211* (2013.01);
(Continued)

(58) Field of Classification Search
CPC .... G09G 3/035; G09G 2380/02; G06F 3/041; G06F 2203/04102; G07F 17/3211; G07F 17/34
See application file for complete search history.

(56) References Cited

U.S. PATENT DOCUMENTS

2004/0202001 A1* 10/2004 Roberts .................... B60Q 9/00
  362/494
2009/0104969 A1*  4/2009 Paulsen ................... G07F 17/34
  463/20
(Continued)

FOREIGN PATENT DOCUMENTS

KR    20120058744 A    6/2012
KR    20140113178 A    9/2014
(Continued)

OTHER PUBLICATIONS

International Search Report dated Nov. 30, 2018 for PCT/KR2018/009977.
(Continued)

*Primary Examiner* — Charles V Hicks
(74) *Attorney, Agent, or Firm* — Schmeiser, Olsen & Watts, LLP

(57) ABSTRACT

An image display device of a slot machine apparatus is provided. In the image display device of a slot machine apparatus, a main image display device is connected to a sub image display device provided at an edge portion of at least one side around the main image display device. The main image display device is formed as a non-flexible image display device, the sub image display device is formed as a flexible image display device, and the edge portion is formed in a curved shape.

6 Claims, 14 Drawing Sheets

(51) Int. Cl.
*G07F 17/32* (2006.01)
*G07F 17/34* (2006.01)

(52) U.S. Cl.
CPC .... *G07F 17/34* (2013.01); *G06F 2203/04102* (2013.01); *G09G 2380/02* (2013.01)

(56) References Cited

U.S. PATENT DOCUMENTS

| | | | | |
|---|---|---|---|---|
| 2014/0198036 | A1* | 7/2014 | Kim | G06F 3/0487 |
| | | | | 345/156 |
| 2016/0034059 | A1* | 2/2016 | Graf | G06F 3/0481 |
| | | | | 345/173 |
| 2017/0220167 | A1* | 8/2017 | Oohira | H04M 1/0266 |
| 2018/0032184 | A1* | 2/2018 | Huang | G06F 3/04184 |

FOREIGN PATENT DOCUMENTS

| | | |
|---|---|---|
| KR | 20150116218 A | 10/2015 |
| KR | 20160027878 A | 3/2016 |
| KR | 20170085344 A | 7/2017 |
| KR | 20170093835 A | 8/2017 |

OTHER PUBLICATIONS

Australian Office Action dated Aug. 4, 2020 for Application No. 2018329316.

* cited by examiner

CROSS-SECTIONAL TOP VIEW

SIDE VIEW

FRONT VIEW

CROSS-SECTIONAL TOP VIEW

SIDE VIEW

FRONT VIEW

IMAGE DISPLAY DEVICE OF SLOT MACHINE APPARATUS

CROSS-REFERENCE TO RELATED APPLICATIONS

This application claims priority to PCT Application No. PCT/KR2018/009977, having a filing date of Aug. 29, 2018, based on KR 10-2017-0113890, having a filing date of Sep. 6, 2017, the entire contents both of which are hereby incorporated by reference.

FIELD OF TECHNOLOGY

The following relates to an image display device of a slot machine apparatus, and more particularly, to an image display device of a slot machine apparatus which is formed as one integrated image display device including a curved edge portion formed by connecting a flexible sub image display device to at least one side edge portion of a main image display device, whereby an image is continuously displayed from the main image display device to the curved sub image display device connected to at least one edge portion of the main image display device.

BACKGROUND

Recently, small terminals (for example, smart phones) have been released that include an image display device including an edge portion formed to have a curved shape (see FIG. 1).

Image display devices having an atypical shape (that is, a curved shape) at an edge portion thereof for such a small terminal may be manufactured because the image display devices applied to the small terminal are made of a material having a flexible characteristic such as a plastic organic light-emitting diode (OLED) material.

On the other hand, in order to convert (or modify) image display devices (for example, liquid crystal displays) made of a material having no flexible characteristics into curved shape types, the image display devices may be converted into atypical shape types (i.e., curved shape types) through an operation such as an operation of etching a liquid crystal. However, there is a limitation on a curvature in which an already manufactured image display device may be modified through physical processing later. As described above, when an image display device, which is not initially made of a flexible material, is modified (or converted) into an atypical shape type (that is, a curved shape type) later, due to physical properties of the image display device, there is a limitation on a curvature that can be changed.

Accordingly, like the above-described image display device of the small terminal, an image display device of a slot machine apparatus being manufactured using a flexible material (for example, a plastic OLED material) may be taken into account. However, the image display device made of the flexible material (in particular, a material such as the OLED material) has an excellent bending property but has disadvantages in that an afterimage occurs and a product is expensive.

For reference, since display manufacturers do not manufacture and sell the image display devices of slot machine apparatuses as image display devices for a slot machine apparatus, slot machine apparatus manufacturers should purchase typical displays sold by the display manufacturers and modify the purchased displays into displays for a slot machine apparatus.

Accordingly, in order for the slot machine apparatus manufacturer to manufacture image display devices capable of displaying an image up to an edge portion in consideration of the above disadvantages, it is proposed as an alternative that image display devices including a bent edge portion are manufactured by connecting a plurality of image display devices (for example, flat liquid crystal display devices) in which a bending property is low but an afterimage does not occur and which are made of a material of which a product price is low (see FIGS. 2A-2C). However, when image display devices are manufactured through a method proposed in the above-described alternative (that is, a method of connecting at least one non-flexible liquid crystal display device to an edge portion to manufacture an image display device in which an image is displayed up to the edge portion), due to an image non-display area of each image display device (i.e., a flat display) connected to the edge portion, i.e., a component such as a black mask or a device fame, it is difficult to continuously display a screen (i.e., display a connected image), and when a bent section of the edge portion is small, an image may be less visible from any one side of front and lateral sides.

In addition, when a touch function is provided in an image display device having an atypical shape (that is, a shape of which an edge portion is bent) manufactured by connecting one or more non-flexible image display devices (i.e., flat displays) to an edge portion of a main image display device, due to a black mask printed (or wrapped with a black sheet) to cover a touch trace area so as to be invisible, continuity of a screen display may be lowered between the connected image display devices (i.e., flat displays).

The background art of embodiments of the present invention is disclosed in Korean Patent Publication No. 10-2012-0058744 (published on Aug. 6, 2012, DISPLAY DEVICE FOR SLOT MACHINE).

SUMMARY

An aspect relates to an image display device of a slot machine apparatus which is manufactured as one integrated image display device including a curved edge portion formed by connecting a flexible sub image display device to at least one side edge portion of a main image display device, whereby an image is continuously displayed from the main image display device to the curved sub image display device connected to at least one side edge portion of the main image display device.

According to embodiments of the present invention, an image display device of a slot machine apparatus is characterized in that a sub image display device is connected to at least one side edge portion of a main image display device, wherein the main image display device is formed as a non-flexible image display device, the sub image display device is formed as a flexible image display device, and the at least one edge portion is formed to have a curved shape.

When the sub image display device is connected to the main image display device, in order to reduce a black mask area that is a non-continuous area of a screen, an external frame may be removed from the main image display device, a liquid crystal of the image display device, which is disposed inside a middle mold, may be disposed on an upper end portion of the middle mold, and the liquid crystal of the image display device may be fixed to the middle mold using an adhesive material.

When a touch screen is attached to the image display device, in order to reduce a black mask area, an area of a touch trace made of a flexible printed circuit board (FPCB)

material may be formed at an end portion of the at least one side edge portion of the image display device and is bent and hidden, or a touch tail may be formed at the end portion of the at least one side edge portion of the image display device.

The touch trace may be transparently made of an indium tin oxide (ITO) material.

The sub image display device may be formed at a preset specific angle with respect to the main image display device, and the preset specific angle may be an angle in a range of 40° to 50°.

When the sub image display device is formed as a non-flexible image display device, a separate optical member configured to improve visibility may be disposed in front of the non-flexible sub image display device.

The main image display device may be implemented as a non-flexible flat or curved image display device.

The main image display device and the sub image display device connected to the main image display device may be formed as an integrated image display device, and a transparent protective material or touch glass may be additionally formed on a front surface or surface portion of the integrated image display device.

According to an aspect of embodiments of the present invention, an image display device of a slot machine apparatus is formed as one integrated image display device including a curved edge portion formed by connecting a flexible sub image display device to at least one side edge portion of a main image display device, and an image is continuously displayed from the main image display device to the curved sub image display device connected to at least one edge portion of the main image display device. Accordingly, it is possible to reduce a manufacturing cost of an image display device for a slot machine apparatus including an edge portion formed to have a curved shape and to allow a continuous image to be displayed from a front surface portion to an edge portion so that the image is more visible from a front side as well as a lateral side.

BRIEF DESCRIPTION

Some of the embodiments will be described in detail, with reference to the following figures, wherein like designations denote like members, wherein.

Figure 9A:
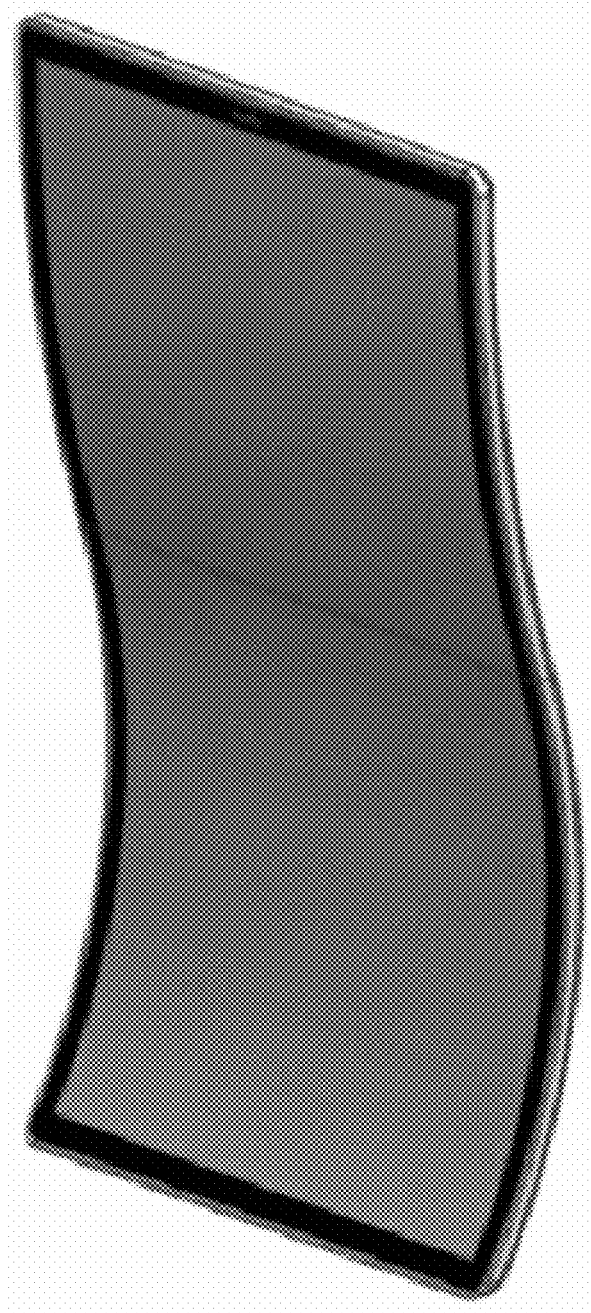
Figure 9B:
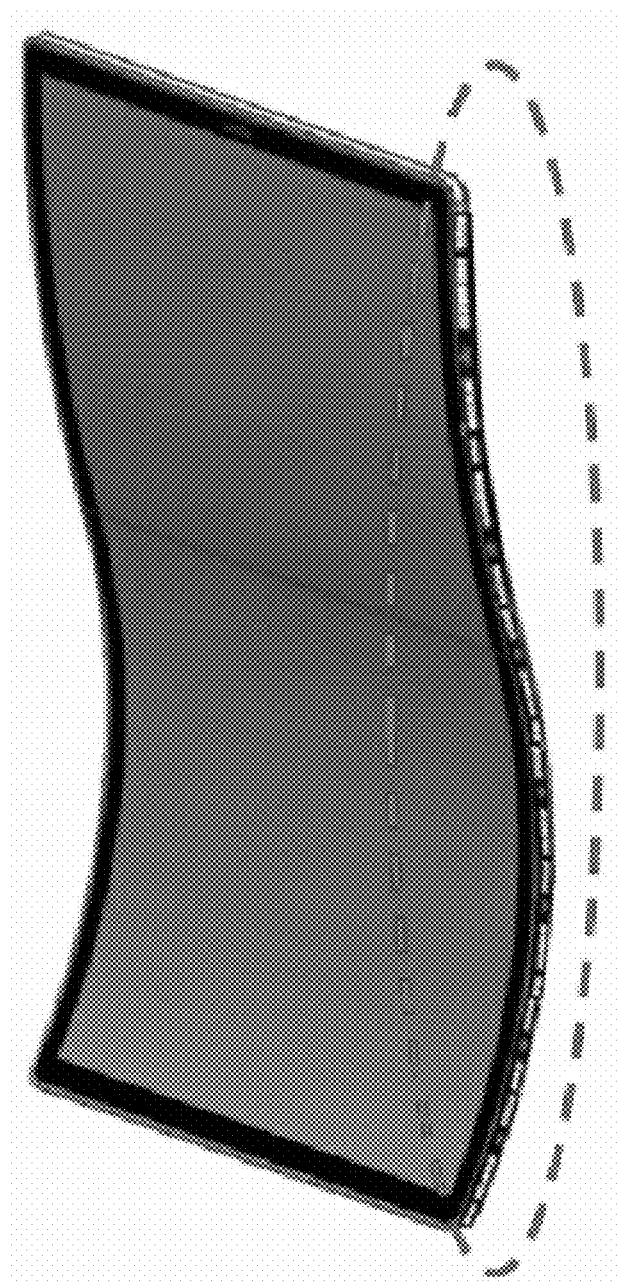

FIG. 9A shows an exemplary view illustrating a slot machine apparatus in which a sub image display device is not connected or formed to an edge portion of a curved main image display device according to embodiments of the present invention; and FIG. 9B shows an exemplary view illustrating a slot machine apparatus in which a sub image display device is connected or formed to an edge portion of a curved main image display device according to embodiments of the present invention.

DETAILED DESCRIPTION

Hereinafter, embodiments of an image display device of a slot machine apparatus according to embodiments of the present invention will be described with reference to the accompanying drawings.

In the drawings, the thicknesses of lines and the sizes of components may be exaggerated for clarity and convenience of description. In addition, the following terms are defined in consideration of functions used in embodiments of the present invention and can be changed according to the intent of a user or an operator, or a convention. Accordingly, definitions of the terms should be understood on the basis of the entire description of the present specification.

Figure 1:
FIG. 1 is an image of a conventional small terminal including an image display device with a curved edge shape.
Figure 2A:
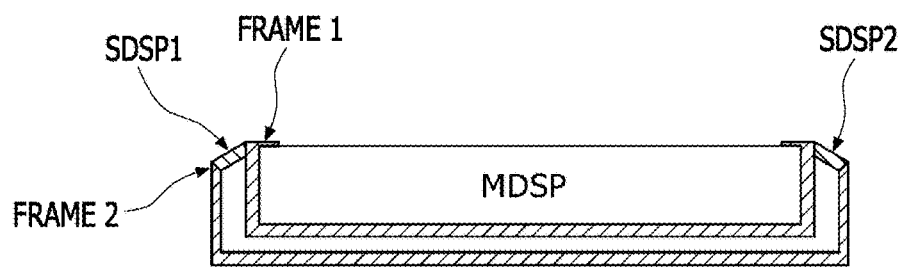
FIG. 2A shows an exemplary cross-sectional top view illustrating a shape of a conventional image display device formed by connecting a plurality of flat image display devices.
Figure 2B:
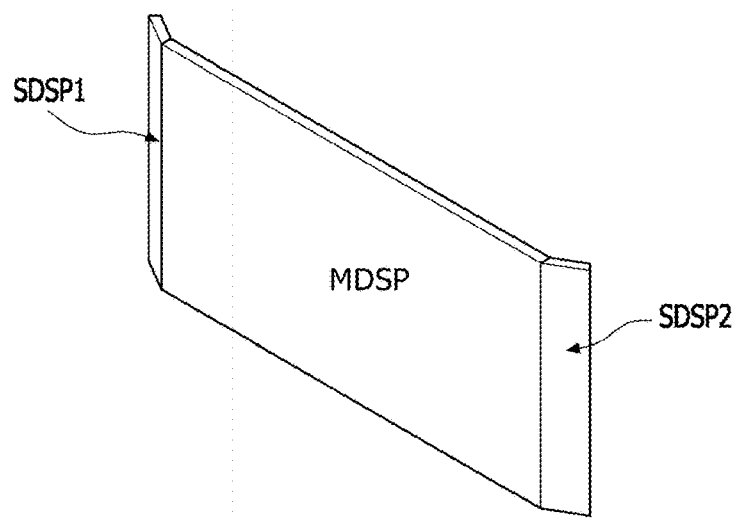
FIG. 2B shows an exemplary side view illustrating a shape of the conventional image display device of FIG. 2A.
Figure 2C:
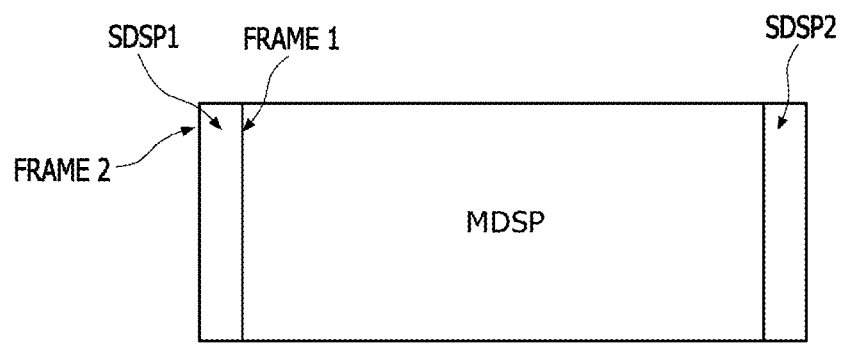
FIG. 2C shows an exemplary front view illustrating a shape of the conventional image display device of FIGS. 2A-2B.
Figure 3A:
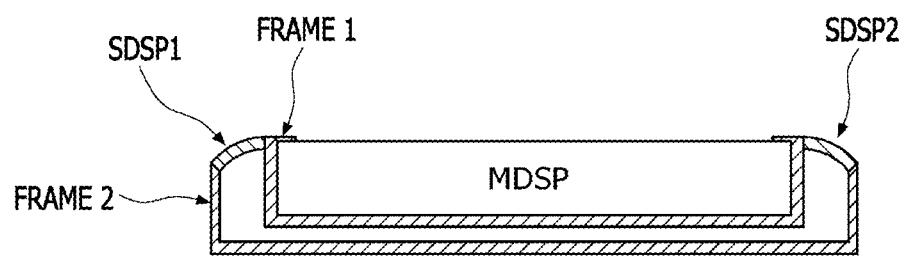
FIG. 3A shows an exemplary cross-sectional top view illustrating a shape of an image display device including a curved edge portion which is integrally formed by connecting a flexible sub image display device to at least one side edge portion of a flat main image display device according to a first embodiment of the present invention.
Figure 3B:
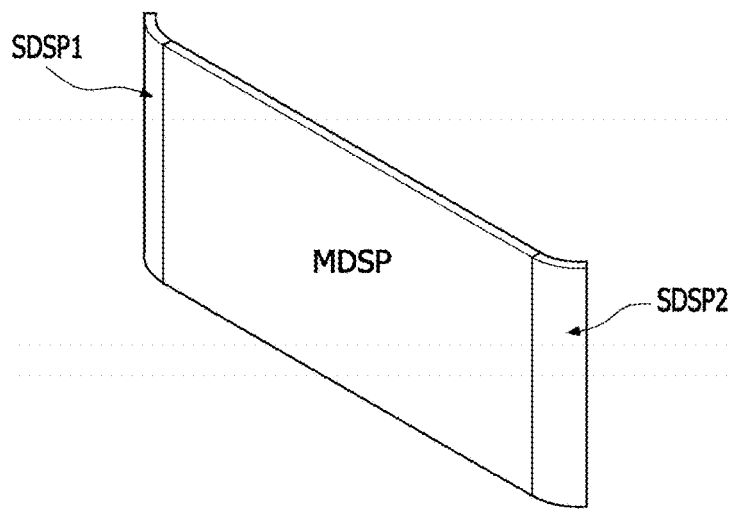
FIG. 3B shows an exemplary side view illustrating a shape of the image display device of FIG. 3A.
Figure 3C:
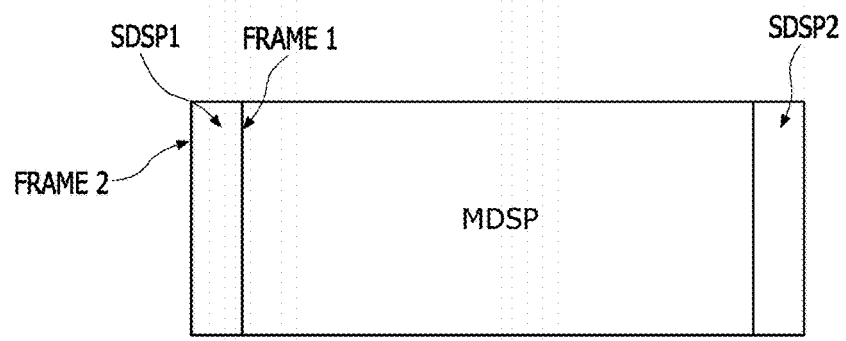
FIG. 3C shows an exemplary front view illustrating a shape of the image display device of FIGS. 3A-3B.

FIGS. 3A-3C shows an exemplary cross-sectional top view, side view, and front view illustrating a shape of an image display device including a curved edge portion, which is integrally formed by connecting a flexible sub image display device to at least one side edge portion of a flat main image display device according to a first embodiment of the present invention.

Referring to FIGS. 3A-3C, a main image display device MDSP may use a flat liquid crystal display device (i.e., a flat display) made of a glass material, and sub image display devices SDSP1 and SDSP2 may use flexible image display devices (i.e., flexible displays) made of a flexible material such as plastic. However, it should be noted that each image display device (i.e., the flat display or the flexible display) described in the present embodiment is given for illustrative purposes and the description is not intended to be limiting.

In addition, in the drawings of the present embodiment, the flexible sub image display devices SDSP1 and SDSP2 are illustrated as being modified into curved shapes and connected to only left and right edge portions of the main image display device MDSP, but embodiments of the present invention is not actually limited thereto. It should be noted that the flexible sub image display devices may be formed to have shapes which are modified into curved shapes and connected to upper and lower edge portions of the main image display device MDSP.

However, for convenience of description, hereinafter, the present embodiment will be described based on the drawings in which the flexible sub image display devices SDSP1 and SDSP2 are modified into the curved shapes and connected to the left and right edge portions of the main image display device MDSP.

Since the sub image display devices SDSP1 and SDSP2 may be easily modified into curved shapes due to characteristics of a flexible material, the flexible sub image display device SDSP1 or SDSP2 may be coupled (connected) as closely as possible to at least one side edge portion of the main image display device MDSP, thereby minimizing a physical non-continuous area of an image (or a screen).

Here, the non-continuous area of the image (screen) refers to, for example, an area (i.e., a black mask area) for covering a frame or a black mask area of a liquid crystal display device or a touch trace area of a touch screen so as to be invisible from a front thereof.

In the present embodiment, a physical (or spatial) non-continuous area between the main image display device and the sub image display device may be reduced as much as possible in one image display device in which the main image display device and the sub image display device connected to the edge portion thereof are integrally formed, thereby securing continuity of an image (or a screen).

Meanwhile, in the present embodiment, the main image display device MDSP refers to an image display device which occupies the largest image display area at a central portion of an image display device having an atypical shape (that is, a shape in which at least one side edge portion of the main image display device has a curved shape). The sub image display device SDSP1 or SDSP2 refers to an image display device having a smaller image display area as compared to the main image display device MDSP and refers to an image display device which is connected to at least one side edge portion of the main image display device MDSP and is relatively smaller than the main image display device.

Accordingly, since the main image display device MDSP occupies the widest image display area in the image display device having an atypical shape (that is, a shape in which at least one side edge portion of the main image display device has a curved shape) according to the present embodiment, a liquid crystal display device or a flat image display device made of a non-flexible (rigid) material may be applied as the main image display device MDSP.

However, the description is not intended to limit a material of the main image display device MDSP.

The reason why the flat image display device made of a non-flexible (rigid) material) is applied as the main image display device MDSP is closely related to a price of the main image display device MDSP that occupies the widest display area in the image display device of a slot machine apparatus. The flat image display device has a low bending property but does not generate an afterimage. In contrast, an image display device made of a material such as a plastic organic light-emitting diode (OLED) or light-emitting diode (LED) material has flexibility capable of self-implementing a small curvature but is relatively expensive.

On the other hand, the sub image display devices SDSP1 and SDSP2 occupy a smaller area (i.e., an edge portion) in the image display device having an atypical shape (that is, a shape in which at least one side edge portion of the main image display device has a curved shape) according to the present embodiment as compared with the main image display device. When a curved image display device which is very bendable is manufactured, an image display device made of a material such as a plastic OLED or LED material is preferable.

This is because the plastic OLED material may be suitable for manufacturing a curved image display device having a small curvature due to the material itself being flexible, and when the LED material is applied to the sub image display device, the LED material may be mounted on a flexible substrate such as a flexible printed circuit board (FPCB) to manufacture a curved image display device having a small curvature (that is, which is very bendable) (see FIGS. 3A-3C, 4A, and 6A-6E).

Figure 4A:
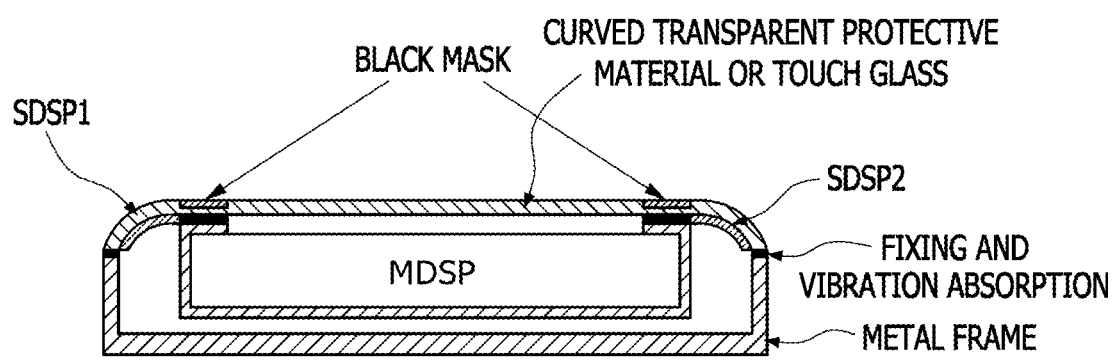
FIG. 4A shows an exemplary cross-sectional top view illustrating a shape of an image display device in which a curved transparent protective material or touch glass is attached to a front surface of the image display device having a flexible sub image display device according to a second embodiment of the present invention.
Figure 5A:
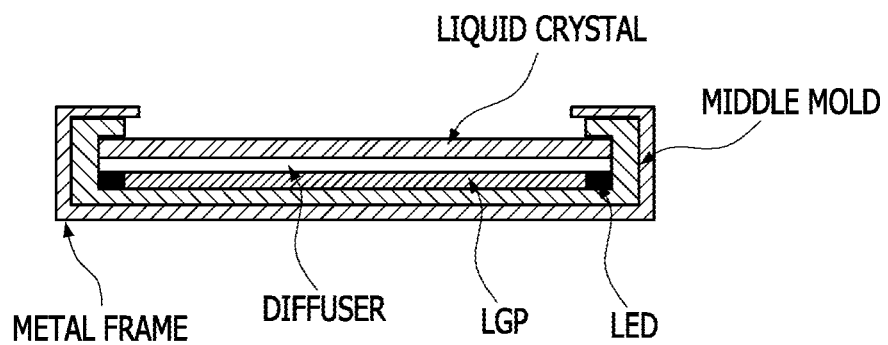
FIG. 5A shows an exemplary view of an image display device according to a third embodiment of the present invention.
Figure 5B:
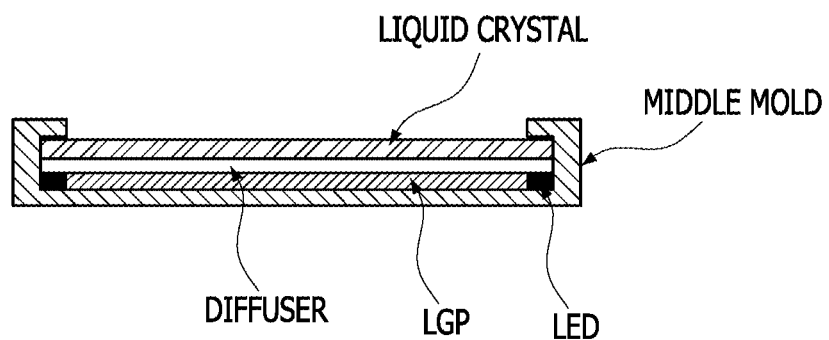
FIG. 5B shows an exemplary view of the image display device of FIG. 5A from which a metal frame has been removed according to the third embodiment of the present invention.
Figure 5C:
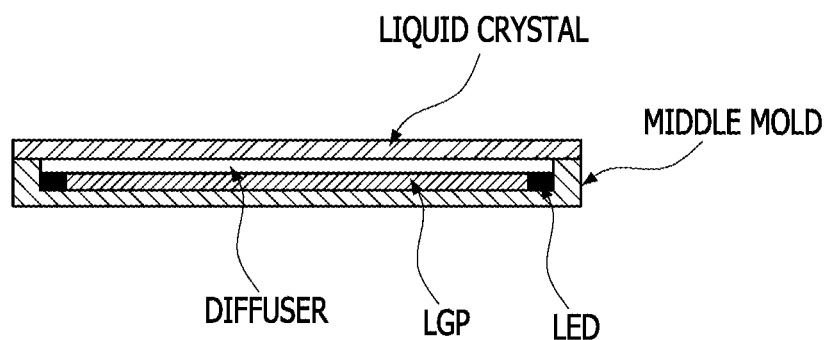
FIG. 5C shows an exemplary view of the image display device of FIGS. 5A and 5B from which the metal frame has been removed and a middle mold portion has been changed according to the third embodiment of the present invention.

FIGS. 4A is an exemplary cross-sectional top view illustrating a shape of an image display device in which a curved transparent protective material or touch glass is attached to a front surface of the image display device according to a second embodiment of the present invention. FIGS. 5A-5C show exemplary views for describing a method of reducing a black mask area by removing a metal frame from an image display device and changing a middle mold portion of the image display device according to a third embodiment of the present invention.

An image display device of a slot machine apparatus according to the present embodiment is basically directed to providing a method of manufacturing an integrated image display device including a curved edge portion formed by connecting a sub image display device SDSP, to which a display made of a flexible material display is applied, to at least one side edge portion of a main image display device MDSP to which a flat display is applied.

Figure 4B:
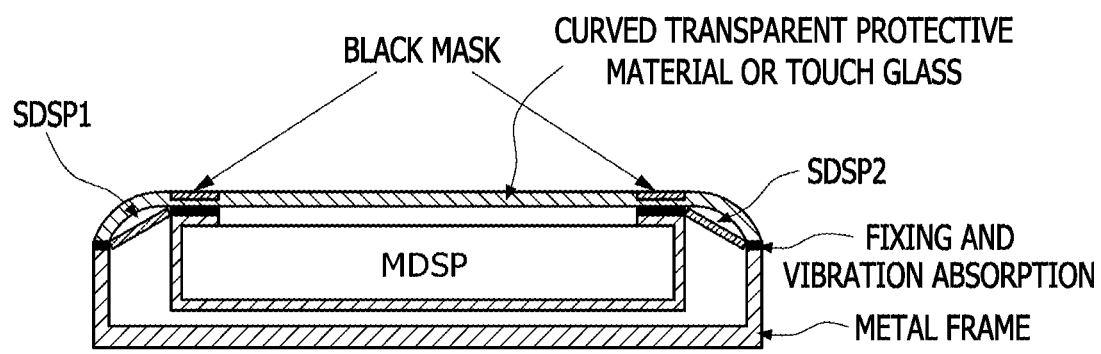
FIG. 4B shows an exemplary cross-sectional top view illustrating a shape of an image display device in which a curved transparent protective material or touch glass is attached to a front surface of the image display device having a rigid sub image display device according to the second embodiment of the present invention.
Figure 4C:
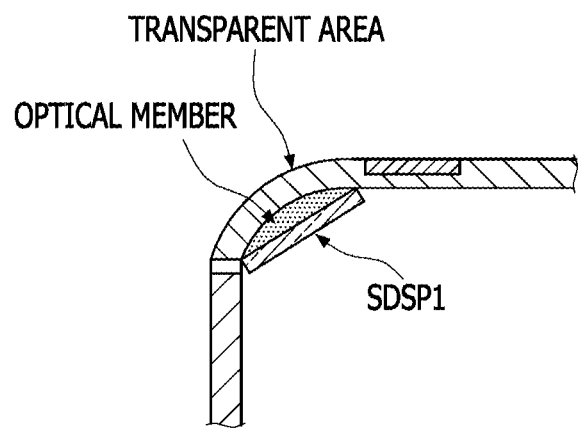
FIG. 4C shows a close up exemplary cross-sectional top view illustrating a shape of an image display device in which a curved transparent protective material or touch glass is attached to a front surface of the image display device having a rigid sub image display device according to the second embodiment of the present invention.

However, embodiments of the present invention is not limited thereto, and the integrated image display device may be implemented using an image display device made of a non-flexible (rigid) material as a sub image display device SDSP1 or SDSP2 (see FIGS. 4B and 4C).

Meanwhile, as shown in FIG. 4A, in the present embodiment, a curved transparent protective material or touch glass may be attached to a front surface (or a surface portion) of the integrated image display device including the edge portion formed to have a curved shape formed by connecting the sub image display device SDSP, to which the display made of a flexible material is applied, to at least one side edge portion of the main image display device MDSP.

As described above, when the curved transparent protective material or touch glass is attached to the font surface (or the surface portion) of the integrated image display device including the edge portion formed to have a curved shape according to the present embodiment, as shown in FIGS. 4B and 4C, a flat image display device such as the main image display device MDSP may be used as the sub image display device SDSP1 or SDSP2 without using a display device made of a flexible material.

In this case, the sub image display device SDSP1 or SDSP2 connected to one side edge portion of the main image display device MDSP may be disposed at a preset specific angle with respect to the main image display device MDSP. Here, the preset specific angle may range from 40° to 50°, and particularly, may most preferably be 45° at which angle visibility is high when viewed from front and lateral sides.

However, as shown in FIGS. 4B and 4C, when the sub image display device SDSP1 or SDSP2 having a non-flexible (rigid) characteristic is disposed (or connected) at a preset specific angle (for example, an angle ranging from 40° to 50°) with respect to the main image display device MDSP, in order to increase visibility from front and lateral sides of the sub image display device SDSP1 or SDSP2, a separate optical member may be disposed at a front side (or a front surface portion) of the sub image display device SDSP1 or SDSP2. Accordingly, a user may more clearly view an image of the sub image display device SDSP1 or SDSP2 from front and lateral sides of the main image display device MDSP (see FIG. 4C).

Meanwhile, as in the present embodiment, in the image display device which is integrally formed by connecting at least one sub image display device SDSP1 or SDSP2 to at least one side edge portion of the main image display device MDSP, as shown in FIGS. 4A, 4B, and 4C, a non-continuous area (for example, a black mask area) is present between the main image display device MDSP and the sub image display device SDSP1 or SDSP2, and thus, a screen is physically (or spatially) separated. As a result, an image does not appear to be continuous.

As described above, the non-continuous area is present due to a frame for fixing the image display devices (that is, the main image display device and the sub image display device connected to the edge portion of the main image display device) and a black mask area printed to cover a touch trace area of a touch screen so as to be invisible from the outside.

Therefore, in order to solve a problem of discontinuity of a screen (or an image) as described above, in the present embodiment, a frame (i.e., a metal frame) formed outside an image display device as shown in FIG. 5A may be removed. In order to arrange the image display device (i.e., a liquid crystal), which is disposed inside a middle mold as shown in FIG. 5B, on an upper end portion of the middle mold as shown in FIG. 5C, the upper end portion of the middle mold may be removed. The image display device (i.e., the liquid crystal) may be disposed on the upper end portion of the middle mold and then fixed using an adhesive material, thereby reducing a black mask area to increase continuity of a screen.

FIGS. 6A-6E shows exemplary views for describing another method of reducing a black mask area by changing an arrangement of a touch tail or a touch trace in an image display device according to a fourth embodiment of the present invention.

Figure 6A:
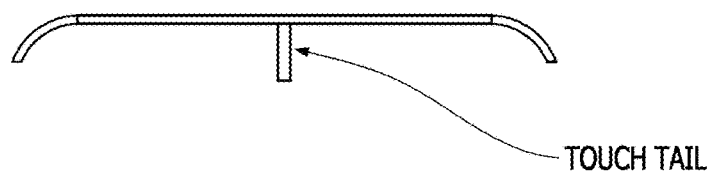
FIG. 6A shows an exemplary view of an image display device according to a fourth embodiment of the present invention.
Figure 6B:
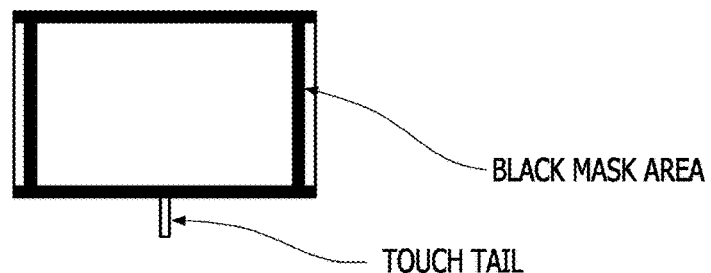
FIG. 6B shows an exemplary cross-sectional view of the image display device of FIG. 6A according to the fourth embodiment of the present invention.

Typically, when a touch screen is attached to an image display device, as shown in FIGS. 6A and 6B, a touch tail is attached.

In particular, as shown in FIG. 6B, in general, a trace area of the touch screen is printed in black (or wrapped with a black sheet) to prevent the trace area from being untidily viewed by a user's eye and to also prevent a metal frame of the image display device from being visible.

However, since the black mask area due to the trace area of the touch screen is wider than a metal frame or a middle mold of the image display device, there is a problem in that a non-continuous area of a screen becomes wider.

Figure 6C:
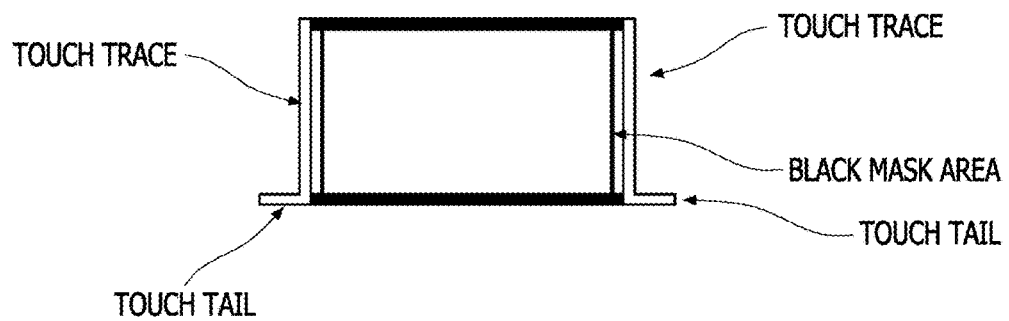
FIG. 6C shows an exemplary view of the image display device of FIGS. 6A and 6B wherein a touch trace area is made of a flexible material and is formed at a side end portion of the image display device according to the fourth embodiment of the present invention.

Therefore, in the present embodiment, in order to solve the above-described problem, as shown in FIG. 6C, a touch trace area made of a flexible material such as an FPCB material may be formed at a side end portion of the image display device and may be bent and hidden so as to be invisible, thereby reducing discontinuity of a screen due to the wide touch trace. In addition, as in a cross-sectional exemplary view shown in FIG. 6D, a touch tail may also be formed at an outer end (i.e., an end of an edge portion) of the image display device.

Figure 6D:
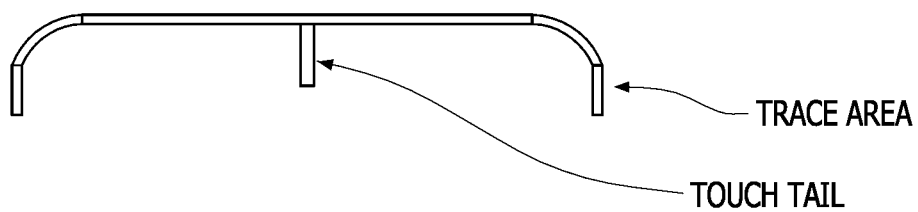
FIG. 6D shows an exemplary cross-sectional view of the image display device of FIGS. 6A-6C wherein a touch tail is formed at an outer end of the image display device according to the fourth embodiment of the present invention.
Figure 6E:
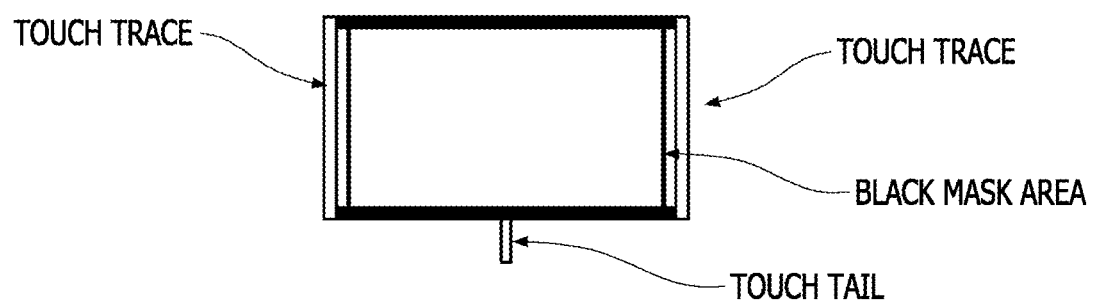
FIG. 6E shows another exemplary view of the image display device of FIGS. 6A-6D wherein a touch tail is formed at an outer end of the image display device according to the fourth embodiment of the present invention.

However, the touch tail is not necessarily formed at the outer end (i.e., the end of the edge portion) of the image display device. As shown in FIGS. 6D and 6E, the touch tail may be formed at a lower center of a touch screen.

Embodiments of the present invention, although not shown in the drawings, the touch trace may be implemented using an invisible material (that is, a transparent material) such as indium tin oxide (ITO), and thus, a separate black mask for a trace may not be required. Accordingly, discontinuity of a screen (or an image) may be reduced.

Figure 7:
FIG. 7 is an exemplary view illustrating a slot machine apparatus in which a sub image display device is formed at an edge portion of a main image display device according to embodiments of the present invention.

FIG. 7 is an exemplary view illustrating an image display device of a slot machine apparatus in which a sub image display device made of a flexible material is formed to be connected to at least one edge portion of a main image display device according to embodiments of the present invention. FIG. 8 shows exemplary views illustrating a side surface portion of a slot machine apparatus in which a flexible sub image display device is formed to be connected to at least one edge portion of a flat main image display device according to embodiments of the present invention. FIG. 9 shows exemplary views illustrating an image display device of a slot machine apparatus in which a sub image display device made of a flexible material is formed on at least one edge portion of a curved main image display device according to embodiments of the present invention.

As shown in FIGS. 7 to 9, in the image display device of a slot machine apparatus according to the present embodiment, at least one flexible sub image display device SDSP1 or SDSP2 may be formed on at least one side edge portion of a main image display device MDSP in a type in which a black mask area may be removed as much as possible.

Therefore, in the above-described embodiment, for convenience of description, although the sub image display devices are coupled (or connected) to only left and right edge portions of the main image display device MDSP, as shown in FIG. 7, sub image display devices made of a flexible material may also be actually connected to upper and lower edge portions and left and right edge portions of the main image display device MDSP.

Figure 8A:
FIG. 8A shows an exemplary view illustrating a slot machine apparatus in which a sub image display device is not connected formed to an edge portion of a flat main image display device according to embodiments of the present invention.
Figure 8B:
FIG. 8B shows an exemplary view illustrating a slot machine apparatus in which a sub image display device is connected or formed to an edge portion of a flat main image display device according to embodiments of the present invention.

FIG. 8A is an exemplary view illustrating an image display device of a slot machine apparatus in which a sub image display device is not connected (or formed) to an edge portion of a flat main image display device. FIG. 8B is an exemplary view illustrating an image display device of a slot machine apparatus in which a sub image display device is connected (or formed) to an edge portion of a flat main image display device.

In the present embodiment, a sub image display device may not only be connected (or formed) to an edge portion of a flat main image display device as shown in FIG. 8B but also may be connected to at least one edge portion of a curved main image display device MDSP as shown in FIG. 9B.

FIG. 9A is an exemplary view illustrating an image display device of a slot machine apparatus in which a sub image display device is not connected (or formed) to an edge portion of a curved main image display device. FIG. 9B is an exemplary view illustrating an image display device of a slot machine apparatus in which a sub image display device is connected (or formed) to an edge portion of a curved main image display device.

As described above, in the present embodiment, in a sub image display device made of a flexible material, which may be modified (or processed) into a curved shape and may be connected (or formed) to at least one edge portion of a flat (or curved) main image display device, it is possible to allow a continuous image to be displayed even on the edge portion, to reduce manufacturing costs of an image display device having a type described in the present embodiment, to minimize a black mask area as much as possible to increase continuity of a screen, and to enable viewing at various angles.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. An image display device of a slot machine apparatus, wherein a sub image display device is connected to at least one side edge portion of a main image display device,
   wherein the main image display device is formed as a non-flexible image display device,
   the sub image display device is formed as a flexible image display device, and
   the at least one side edge portion is formed to have a curved shape;
   wherein, when the sub image display device is connected to the main image display device, in order to reduce a black mask area that is a non-continuous area of a screen;
   no external frame is provided on the main image display device;
   a liquid crystal of the image display device, which is disposed inside a middle mold, is disposed on an upper end portion of the middle mold; and
   the liquid crystal of the image display device is fixed to the middle mold using an adhesive material, and
   wherein the middle mold is formed to surround a rear surface and a side surface of the liquid crystal and formed for a front surface of the liquid crystal to be opened.

2. The image display device of claim 1, wherein, when a touch screen is attached to the image display device:
   an area of a touch trace made of a flexible material is formed at an end portion of the at least one side edge portion of the image display device and is bent and hidden; or
   a touch tail is formed at the end portion of the at least one side edge portion of the image display device.

3. The image display device of claim 2, wherein the touch trace is transparently made of an indium tin oxide (ITO) material.

4. The image display device of claim 1, wherein the sub image display device is formed at a preset specific angle with respect to the main image display device.

5. The image display device of claim 1, wherein the main image display device is implemented as a non-flexible flat or curved image display device.

6. The image display device of claim 1, wherein the main image display device and the sub image display device connected to the main image display device are formed as an integrated image display device, and
   a transparent protective material or touch glass is additionally formed on a front surface or surface portion of the integrated image display device.

* * * * *